(12) United States Patent
Zhang et al.

(10) Patent No.: US 12,325,785 B2
(45) Date of Patent: Jun. 10, 2025

(54) THERMAL INSULATION COMPOSITION AND PREPARATION METHOD AND APPLICATION

(71) Applicant: Hefei Gotion High-Tech Power Energy Co., Ltd., Hefei (CN)

(72) Inventors: Ya Zhang, Hefei (CN); Xiaofeng Guo, Hefei (CN); Zhihong Lin, Hefei (CN); Qian Cheng, Hefei (CN); Dingguo Wu, Hefei (CN)

(73) Assignee: Hefei Gotion High-Tech Power Energy Co., LTD., Hefei (CN)

( * ) Notice: Subject to any disclaimer, the term of this patent is extended or adjusted under 35 U.S.C. 154(b) by 703 days.

(21) Appl. No.: 17/589,733

(22) Filed: Jan. 31, 2022

(65) Prior Publication Data

US 2022/0153958 A1    May 19, 2022

Related U.S. Application Data

(63) Continuation of application No. PCT/CN2019/098101, filed on Jul. 29, 2019.

(51) Int. Cl.
| | | |
|---|---|---|
| *C08K 3/36* | (2006.01) | |
| *C01B 33/155* | (2006.01) | |
| *C01B 33/158* | (2006.01) | |
| *C08G 64/02* | (2006.01) | |
| *C08J 3/20* | (2006.01) | |
| *C08K 7/14* | (2006.01) | |
| *H01M 10/658* | (2014.01) | |

(52) U.S. Cl.
CPC .............. *C08K 3/36* (2013.01); *C01B 33/155* (2013.01); *C01B 33/1585* (2013.01); *C08G 64/0208* (2013.01); *C08J 3/201* (2013.01); *C08K 7/14* (2013.01); *H01M 10/658* (2015.04); *C01P 2004/62* (2013.01); *C01P 2006/32* (2013.01); *C08J 2369/00* (2013.01); *C08K 2201/005* (2013.01)

(58) Field of Classification Search
CPC ...... C08K 3/36; C08K 7/14; C08K 2201/005; C08K 7/26; C08K 2201/011; C01B 33/155; C01B 33/1585; C08G 64/0208; C08J 3/201; C08J 2369/00; H01M 10/658; H01M 10/0525; H01M 50/437; H01M 50/446; C01P 2004/62; C01P 2006/32; C01P 2004/60; C01P 2006/16; Y02E 60/10
See application file for complete search history.

(56) References Cited

U.S. PATENT DOCUMENTS

| | | | |
|---|---|---|---|
| 5,443,746 A | 8/1995 | Harris et al. | |
| 5,731,360 A | 3/1998 | Pekala et al. | |
| 10,640,629 B2 * | 5/2020 | Kim | ........................ C08L 31/06 |
| 2014/0127490 A1 | 5/2014 | Islam et al. | |
| 2017/0096548 A1 * | 4/2017 | Kim | ...................... C01B 33/155 |
| 2019/0148696 A1 | 5/2019 | Kaye et al. | |

FOREIGN PATENT DOCUMENTS

| | | |
|---|---|---|
| CN | 102239114 B | 5/2013 |
| CN | 105452387 A | 3/2016 |
| CN | 106422995 A | 2/2017 |
| CN | 107099117 A | 8/2017 |
| CN | 107286491 A | 10/2017 |
| CN | 108699259 A | 10/2018 |

OTHER PUBLICATIONS

Askowski, Jessica et al. "Aerogel-aerogel composites for normal temperature range thermal insulations" Journal of Non-Crystalline Solids, vol. 441, Apr. 2, 2016, pp. 42-48.
Liang, Yuying et al. "Optimizations of Thermal and Mechanical Properties of Silica Aerogel Composite" Bulletin of the Chinese Ceramic Society, vol. 36, No. 5, May 15, 2017, pp. 1693-1699.
An, Jingjing et al. "Research Progress on Thermal Degradation and Stability of Eco-Friendly Material Poly (propylene carbonate)" Plastics, vol. 43, No. 4, Aug. 18, 2014, pp. 60-64.
Muthuraj, Rajendran et al. "Mechanical and thermal insulation properties of elium acrylic resin/ cellulose hanofiber based composite aerogels" Nano-Structures & Nano-Objects, vol. 12, Oct. 31, 2017, pp. 68-76.
International Search Report for corresponding International Patent Application No. PCT/CN2019/098101 dated Mar. 10, 2020.
Extended European Search Report issued on Jul. 14, 2022 for counterpart European Patent Application No. 19939144.2, 6 pgs.

* cited by examiner

*Primary Examiner* — Anthony J Green
(74) *Attorney, Agent, or Firm* — Michael F. Fedrick; LOZA & LOZA, LLP

(57) ABSTRACT

The present invention provides a thermal insulation composition and a preparation method and application. The thermal insulation composition is composed of aerogel material and organic resin; the composite mass ratio of the aerogel material to the organic resin is 5 wt %:95 wt % to 50 wt %:50 wt %; the porosity of the aerogel material is greater than 95%, the pore diameter of the aerogel material is less than or equal to 100 nm, the particle size of each particle of aerogel material is 5 nm to 20 nm, and the organic resin is filled in the pores of the aerogel material. The thermal insulation module component prepared from the thermal insulation composition has mechanical strength and thermal conductivity at room temperature, and if the battery goes into thermal runaway, the material becomes a heat-insulating material, blocking the heat transfer between battery cells, greatly improving the safety performance of the battery.

15 Claims, 3 Drawing Sheets

THERMAL INSULATION COMPOSITION AND PREPARATION METHOD AND APPLICATION

CROSS-REFERENCE TO RELATED APPLICATIONS

This application is a continuation of International Application No. PCT/CN2019/098101, filed on Jul. 29, 2019, the content of which is hereby incorporated by reference in its entirety.

FIELD OF THE INVENTION

The present disclosure relates to a thermal insulation composition, and in particular to a thermal insulation composition that can be used in a thermal insulation module component of lithium-ion battery, and belongs to the technical field of thermal insulation materials.

BACKGROUND ART

In the past two decades, lithium-ion batteries have become the most important power source for new energy vehicles. The current commercialized Li-ion batteries in the industry have a structure with graphite as the anode and layered LiMO (M=Ni, Co, Mn binary or ternary system) as the cathode, and the unit cell thereof has an energy density of greater than 250 Wh/kg. Higher energy density (>300 Wh/kg) is still being pursued within the industry.

Compared to lithium iron phosphate batteries with relatively low energy density (160-180 Wh/kg), high nickel NCM or NCA batteries have a great advantage in terms of high energy density. However, due to the elevated nickel content, the stability and heat generation of the positive electrode material increases significantly, which greatly reduces the safety compared to using LFP or low nickel positive electrode materials (NCM111, NCM523), and when the battery is subjected to high temperature, overcharge or internal short circuit, thermal runaway and thermal diffusion to the surrounding cells can easily occur. Thus it is likely to cause a fire or explosion in the battery due to heat propagation, thus seriously endangering personal safety.

Therefore, it is very important to control the thermal runaway of a unit cell within a certain range, and stop the thermal diffusion between one or more cells under thermal runaway in the battery module.

The existing module structural components are generally of resin or aluminum alloy materials, which do not have the performance of thermal insulation and fire prevention when the thermal runaway of cell occurs.

SUMMARY OF THE INVENTION

In order to solve the above technical problem, an object of the present disclosure is to provide a module component, which not only has mechanical strength and functionality, but also can play the role of fire prevention and thermal insulation in case of thermal runaway, blocking heat propagation and greatly improving the safety performance of the battery.

In order to achieve the above object, the present disclosure provides a thermal insulation composition, wherein the thermal insulation composition comprises a composite of an aerogel material and an organic resin, and the composite mass ratio of the aerogel material to the organic resin is 5 wt %:95 wt % to 50 wt %:50 wt %.

The porosity of the aerogel material used is greater than 95% (the porosity of the aerogel material refers to the porosity that the aerogel material has before it is filled with organic resin), the pore size of the aerogel material is less than or equal to 100 nm, the particle size of each particle of the aerogel material is 5 nm to 20 nm, and the organic resin is filled in the pores of the aerogel material.

The thermal insulation composition of the present disclosure has both mechanical strength and heat conduction capability at normal temperature, and when a certain temperature is reached, the composition will become an adiabatic material with extremely high thermal insulation performance, blocking the heat transfer between the cells, which can greatly improve the safety of the battery.

The thermal insulation composition of the present disclosure comprises a thermally insulating aerogel material and an organic resin. At normal temperature, more than 95% of the aerogel material are air pores, which are filled with the organic resin. The organic resin-filled aerogel material can achieve sufficient mechanical strength and thermal conductivity. At high temperature (e.g., above 180° C.), the degradation temperature of the organic resin is reached, so that the organic resin decomposes into carbon dioxide and water, leaving the aerogel material with ultra-low thermal conductivity, which can effectively block heat propagation.

The aerogel material used in the thermal insulation composition of the present disclosure not only has an ultra-low thermal conductivity, but also has the advantages of light weight and high thermal stability.

In a specific embodiment of the present disclosure, the aerogel material is prepared by the steps of:
preparing a precursor solution for forming the aerogel material;
solating the precursor solution by a polycondensation reaction;
aging the solated precursor solution at 45° C. to 60° C. for 8 to 24 hours; and
performing supercritical drying to obtain the aerogel material.

In the preparation of the aerogel material of the present disclosure, the precursor solution used to form the aerogel material is a mixture of the aerogel material and a solvent, and it is a stably present solution. There are no particular limit on the method for forming the stable precursor solution. For example, the solvent employed may be an aqueous liquid, such as water or a water/ethanol mixture; or an organic solvent, such as N-methylpyrrolidone, propylene carbonate solvent, propylene carbonate, ethylene carbonate, diethyl carbonate, or dimethyl carbonate; or an ionic liquid, such as, 1-ethyl-3-methylimidazolium bis(trifluoromethanesulfonyl)imide.

In the preparation of the aerogel material of the present disclosure, the raw material of the aerogel material employed comprises a precursor, and the precursor employed has a particle size of less than 500 nm; preferably 100 nm or less, more preferably 50 nm or less.

In a specific embodiment of the present disclosure, the precursor employed comprises one or two or more of silica, titanium oxide, chromium oxide, iron oxide, vanadium oxide, neodymium oxide, carbon (including carbon nanotubes), and oxides of carbon.

Specifically, the precursor employed comprises one or two or more of silica, titanium oxide, and carbon.

More specifically, the precursor employed is silica.

In the preparation of the aerogel material of the present disclosure, the raw material of the aerogel material employed may further comprise an additive, and the precursor is added in an amount of 60% to 90% by weight when the additive is comprised. For example, the aerogel material may comprise 60% to 90% by mass of $SiO_2$ or a particle mixture of $SiO_2$ and $TiO_2$ with a particle size of 10 nm; the aerogel material may comprise 5% to 30% by mass of SiC with a particle size of 20 μm and 2% to 10% by mass of glass fibers with a length of 100 μm.

Specifically, the additive employed comprises one or two or more of a glass fiber and an opacifier.

For example, the additive can be used to enhance the structural stability of the aerogel material. For example, the aerogel material may comprise a glass fiber as a binder to increase the mechanical strength of the aerogel material; for example, a glass fiber with a length of 10 μm-2 mm is used.

For example, radiative heat conduction occurs at high temperature, and the aerogel material may comprise an opacifier such as SiC, $TiO_2$, or carbon black. These opacifier particles are uniformly distributed in the aerogel material and disperse up to 95% of the infrared radiation to block thermal radiation, especially at high temperature. The opacifier may be mono- or polycrystalline, or particles with a particle size of 1 μm to 50 μm. The particle size can be measured by a laser particle size analyzer such as HORIBA LA-960. Herein, the particle size can refer to the secondary particle size of polycrystalline particles.

During the preparation of the aerogel material of the present disclosure, an oxide chemical bond or an alcohol chemical bond can be formed by a polycondensation reaction, which allows the solution containing the precursor to be solated, and in turn leads to a significant increase in the viscosity of the solution.

In a specific embodiment of the present disclosure, the polycondensation reaction can be initiated by changing the pH of the solution. Specifically, an alkaline solution can be added to the solution to adjust the pH of the precursor solution.

The alkaline solution is not particularly limited in the present disclosure and may include solutions of alkali metal hydroxides such as NaOH or KOH, solutions of alkaline earth metal hydroxides such as $MgOH_2$, and solutions of carbonates such as $Na_2CO_3$. The pH value is not limited, and can be determined by the type of the precursor.

For example, when the precursor comprises silicate and titanate, the pH of the solution can be adjusted to 3 to 4 using the alkaline solution NaOH to form $SiO_2/TiO_2$ sol.

In the preparation of the aerogel material of the present disclosure, the gel is prepared by aging. During this period, the polycondensation reaction continues and the solvent is expelled from the pores of the gel until the sol is converted into a gel.

In a specific embodiment of the present disclosure, the aging process can be carried out at 50° C. to 55° C. for 8 to 10 hours.

For example, in the case of solating the precursor solution by a polycondensation reaction to form $SiO_2/TiO_2$ sol, the $SiO_2/TiO_2$ sol can be aged at 50° C. for 10 hours to form a gel.

In the preparation of the aerogel material of the present disclosure, the resulting gel obtained after aging is supercritically dried and shaped into the desired shape to obtain the aerogel material. Meanwhile, the solvent can be removed in this step.

During the preparation of the aerogel material of the present disclosure, the solution is completely evaporated during the supercritical drying, leaving a polymeric framework.

In a specific embodiment of the present disclosure, the supercritical drying is performed at a temperature 30° C. to 60° C. More specifically, the supercritical drying is performed at a temperature of 40° C. to 45° C.

In a specific embodiment of the present disclosure, the medium used in the supercritical drying is carbon dioxide, methanol or ethanol; preferably carbon dioxide.

In a specific embodiment of the present disclosure, the supercritical drying is carried out for 2 to 5 hours. More specifically, the supercritical drying is carried out for 2 to 3 hours.

In a specific embodiment of the present disclosure, the supercritical drying is carried out under a pressure of higher than 1.01 MPa; the supercritical drying is preferably carried out under a pressure of higher than 5.06 MPa; more preferably, the supercritical drying is carried out under a pressure of higher than 7.38 MPa.

For example, the $SiO_2/TiO_2$ gel formed after aging is dried in supercritical $CO_2$ medium at 50° C. for 2 hours to form $SiO_2/TiO_2$ aerogel.

The aerogel material obtained by the above preparation method of the present disclosure has higher porosity, lower thermal conductivity, smaller pore size and smaller particle size.

The porosity of the aerogel material of the present disclosure can be represented by a percentage of air volume (%). The aerogel material of the present disclosure has a porosity greater than 95%, preferably greater than 97%, and more preferably a percentage of air volume of greater than 99%.

The pores of the aerogel material of the present disclosure have a pore size of 100 nm or less, more preferably a pore size of 50 nm or less, and most preferably a pore size of 10 nm or less.

The aerogel material of the present disclosure may have a thickness of about 500 μm or greater, preferably a thickness of about 1000 μm or greater, more preferably a thickness of about 1200 μm or greater, and preferably a thickness of 2000 μm or less, more preferably a thickness of 1500 μm or less. It can be more easily manufactured and better match the battery.

The aerogel material of the present disclosure has an extremely low shrinkage rate at high temperature. For example, after heating at 600° C. for 24 hours, the aerogel material may have a shrinkage rate of less than 0.5%, preferably less than 0.1%, and more preferably 0%. In addition, the shrinkage of the aerogel material may be less than 2%, preferably less than 1.5%, more preferably less than 1%, after heating at 900° C. for 24 hours.

During the charging and discharging process of cells, thermal expansion will occur, and the aerogel material will be subjected to the compression force of adjacent cells due to thermal expansion, resulting in the deformation of the aerogel. The aerogel material of the present disclosure has a compressive deformation rate of 10% or higher, preferably 10% to 15%, in a compression experiment. The compression experiment is performed under the following conditions: a load of 10 kg (5×5 $mm^2$) is applied to a sample having a size of 3×3 $mm^2$ and a thickness of 1 mm for a duration of 1 hour.

The aerogel material of the present disclosure has a thermal conductivity of 25 mW/(mK) or less, preferably 5 mW/(mK) or less.

In the thermal insulation compositions of the present disclosure, the aerogel material comprises a precursor for forming an aerogel framework.

In a specific embodiment of the present disclosure, the precursor employed has a particle size of less than 500 nm; preferably 100 nm or less, more preferably 50 nm or less.

In a specific embodiment of the present disclosure, the precursor employed comprises one or two or more of silica, titanium oxide, chromium oxide, iron oxide, vanadium oxide, neodymium oxide, carbon (including carbon nanotubes), and oxides of carbon.

Specifically, the precursor employed comprises one or two or more of silica, titanium oxide, and carbon.

More specifically, the precursor employed is silica.

In the thermal insulation composition of the present disclosure, the aerogel material may further comprise an additive, and the precursor is added in an amount of 60% to 90% by weight when the additive is comprised. For example, the aerogel material may comprise 60% to 90% by mass of $SiO_2$ or a particle mixture of $SiO_2$ and $TiO_2$ with a particle size of 10 nm; the aerogel material may comprise 5% to 30% by mass of SiC with a particle size of 20 µm and 2% to 10% by mass of glass fibers with a length of 100 µm.

Specifically, the additives employed is one or two or more of a glass fiber and an opacifier.

For example, the additive can be used to enhance the structural stability of the aerogel material. For example, the aerogel material may comprise a glass fiber as a binder to increase the mechanical strength of the aerogel material; for example, a glass fiber with a length of 10 µm-2 mm is used.

For example, radiative heat conduction occurs at high temperature, and the aerogel material may comprise an opacifier such as SiC, $TiO_2$, or carbon black. These opacifier particles are uniformly distributed in the aerogel material and disperse up to 95% of the infrared radiation to block thermal radiation, especially at high temperature. The opacifier may be mono- or polycrystalline, or particles with a particle size of 1 µm to 50 µm. The particle size can be measured by a laser particle size analyzer such as HORIBA LA-960. Herein, the particle size can refer to the secondary particle size of polycrystalline particles.

In a specific embodiment of the present disclosure, the organic resin employed comprises any one or two or more of polymethyl carbonate, polyethyl carbonate, polypropylene carbonate (PPC), and polymethyl carbonate, polyethyl carbonate, and polypropylene carbonate modified with a functional group.

Specifically, the functional group can be hydroxyl, carboxyl, halogen or propylene oxide. By modifying the molecular chain, especially by adding propylene oxide, epoxides with ester groups can reduce the decomposition temperature from 200° C.-250° C. to near 150° C. Alternatively, the decomposition temperature of the organic resin can be controlled by adding inorganic substances such as hydrochloric acid, sulfuric acid, potassium hydroxide, or salts such as sodium carbonate or sodium sulfate.

The present disclosure also provides a method for preparing the thermal insulation composition by impregnating the aerogel material in the organic resin under vacuum, infiltrating the organic resin into the aerogel under a certain pressure and then recovering the excess organic resin under isobaric pressure, and continuing to heat up the organic resin under isobaric pressure to thermally cure it. The above operations are cyclically repeated several times to prepare the thermal insulation composition.

Specifically, the method for preparing the thermal insulation composition of the present disclosure comprises the following steps:

heating the organic resin to above the melt processing temperature;

fully impregnating an aerogel material in the organic resin under vacuum;

fully infiltrating the organic resin into the aerogel material under 0.5 MPa to 2 MPa (preferably 1.2 MPa), holding the pressure for 10 to 60 minutes (preferably 30 minutes), and recovering the excess organic resin;

cyclically repeating the above operations (impregnation, infiltration and recovery) so that the organic resin is completely infiltrated into the aerogel material;

removing a sample and curing it at normal temperature to obtain the thermal insulation composition.

The present disclosure also provides a thermal insulation module component, wherein the thermal insulation module component is prepared from the thermal insulation composition of the present disclosure.

The thermal insulation module component of the present disclosure has both mechanical strength and heat conduction capability at normal temperature, and can be used as a battery module component and a structural material for a pack. When the battery enters thermal runaway, the thermal insulation module component will become an adiabatic material with extremely high thermal insulation performance, blocking the heat transfer between cells, which can greatly improve the safety of the battery.

The thermal insulation module component of the present disclosure comprises a thermally insulating aerogel material and an organic resin. At normal temperature, the pores of the aerogel material filled with the organic resin can achieve sufficient mechanical strength and thermal conductivity; when thermal runaway occurs, as the temperature rises above 180° C. to reach the degradation temperature of the organic resin binder (thermal degradation usually occurs near 170° C.), the organic resin binder is decomposed into carbon dioxide and water, leaving only the aerogel material, which has excellent thermal insulation performance and can effectively block heat propagation.

The present disclosure also provides a lithium-ion battery that comprises the thermal insulation module component of the present disclosure. The lithium-ion battery of the present disclosure has a high safety performance due to comprising the thermal insulation module component of the present disclosure.

The thermal insulation module component of the present disclosure has advantages of light weight, good thermal insulation performance and high mechanical strength; it can solve the problem of heat propagation in the battery box, i.e., when thermal runaway occurs in one cell, the heat propagation can be effectively blocked and the thermal runaway is limited within a controllable range, which greatly improves the safety of Li-ion batteries.

DETAILED DESCRIPTION OF THE INVENTION

In order to more clearly understand the technical features, objects and beneficial effects of the present disclosure, the technical solutions of the present disclosure are described below in details, which should not be construed as limiting the implementable scope of the present disclosure.

Comparative Example 1

A 100% PPC sheet with a thickness of 1 mm was used to test its thermal conductivity.

The temperature of the heating plate was adjusted to 60° C. The PPC sheet was placed on the heating plate so that one side of the PPC sheet was in contact with the heating plate, and the temperature of the other side of the PPC sheet was recorded after the PPC sheet was heated for 1 minute and 5 minutes. The results are listed in Table 1.

Example 1

Figure 1:
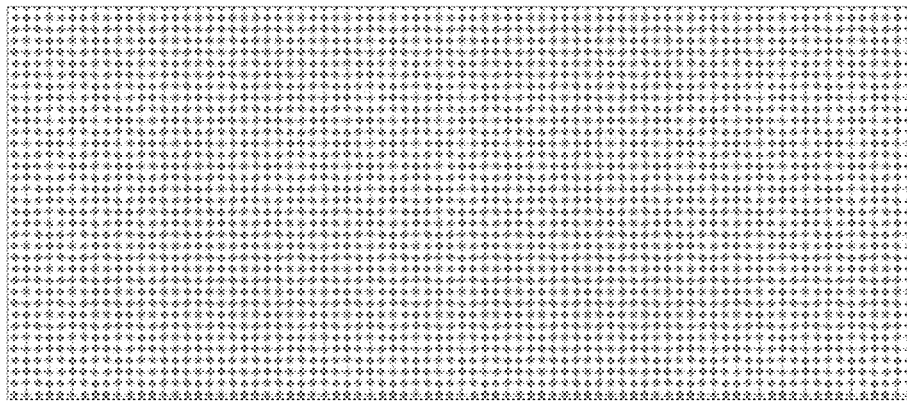
FIG. 1 is a schematic diagram of the structure of the thermal insulation composition in the Examples of the present disclosure.

A composite thermal insulation material with a thickness of 1 mm was used, which had a structure as shown in FIG. 1, with an organic resin (100% PPC) filled in the pores of the aerogel material. The thermal conductivity thereof was tested. It should be noted that the organic resin can be randomly filled into the pores of the aerogel material without a regular filling as shown in FIG. 1, which is only a schematic illustration.

The temperature of the heating plate was adjusted to 60° C. The above composite thermal insulation material was placed on the heating plate so that one side of the composite thermal insulation material was in contact with the heating plate, and the temperature of the other side of the composite thermal insulation material was recorded after the composite thermal insulation material was heated for 1 minute and 5 minutes. The results are listed in Table 1.

The aerogel material of the Example was prepared by the steps of:
- preparing a precursor solution for forming the aerogel material (the solvent was a mixed solution of water: ethanol=1:1, and the precursor was ethyl orthosilicate);
- solating the precursor solution by a polycondensation reaction.
- aging the solated precursor solution at 45° C. to 60° C. for 8 to 24 hours.
- performing supercritical drying (at a temperature of 40° C. to 45° C. and a pressure of 7.38 MPa, holding for 2 to 3 hours) to obtain the aerogel material.

The composite thermal insulation material was prepared through the steps of:
- heating the organic resin to the melt processing temperature or higher (105° C. to 130° C.);
- fully impregnating the aerogel material in the organic resin under vacuum;
- fully infiltrating the organic resin into the aerogel material under 1.2 MPa, holding the pressure for 30 minutes, and recovering the excess organic resin;
- cyclically repeating the impregnation, infiltration and recovery steps three times so that the organic resin was completely infiltrated into the aerogel material;
- removing a sample and curing it at normal temperature to obtain the thermal insulation composition.

Example 2

A composite thermal insulation material with a thickness of 2 mm (the preparation method and the composition of the composite material were the same as those in Example 1, and only the thickness was changed) was used to test its thermal conductivity.

The temperature of the heating plate was adjusted to 60° C. The above composite thermal insulation material was placed on the heating plate so that one side of the composite thermal insulation material was in contact with the heating plate, and the temperature of the other side of the composite thermal insulation material was recorded after the composite thermal insulation material was heated for 1 minute and 5 minutes. The results are listed in Table 1.

TABLE 1

| Example | Thickness | Heating plate surface temperature | Heating time | Material surface temperature after heating |
|---|---|---|---|---|
| Comparative Example 1 | 1 mm | 60° C. | 1 minute | 60° C. |
|  |  |  | 5 minutes | 60° C. |
| Example 1 | 1 mm | 60° C. | 1 minute | 60° C. |
|  |  |  | 5 minutes | 61° C. |
| Example 2 | 2 mm | 61° C. | 1 minute | 55° C. |
|  |  |  | 5 minutes | 60° C. |

Table 1 shows that the pure PPC of Comparative Example 1 has a good thermal conductivity. The 1 mm adiabatic material mixed with PPC of Example 1 also has the same thermal conductivity, and 61° C. was within the experimental error range. The 2 mm adiabatic material mixed with PPC of Example 2 is poorer than the 1 mm material, but still has an ideal performance.

Comparative Example 2

A mica sheet (IEC-60371-2, AXIM MICA) with a thickness of 1 mm was used as a thermal insulation sheet to test its thermal insulation performance.

The temperature of the heating plate was adjusted to 60° C. The above mica sheet was placed on the heating plate so that one side of the mica sheet was in contact with the heating plate, and the temperature of the other side of the mica sheet was recorded after the mica sheet was heated for 5 minutes. The results are listed in Table 2.

Example 3

The composite thermal insulation material of Example 1 with a thickness of 1 mm was used as a thermal insulation sheet to test its thermal insulation performance.

The temperature of the heating plate was adjusted to 600° C. The above composite thermal insulation material was placed on the heating plate so that one side of the composite thermal insulation material was in contact with the heating plate, and the temperature of the other side of the composite thermal insulation material was recorded after the composite thermal insulation material was heated for 5 minutes. The results are listed in Table 2.

Example 4

The composite thermal insulation material of Example 2 with a thickness of 2 mm was used as a thermal insulation sheet to test its thermal insulation performance.

The temperature of the heating plate was adjusted to 600° C. The above composite thermal insulation material was placed on the heating plate so that one side of the composite thermal insulation material was in contact with the heating plate, and the temperature of the other side of the composite thermal insulation material was recorded after the composite thermal insulation material was heated for 5 minutes. The results are listed in Table 2.

TABLE 2

| Example | Thickness | Heating plate surface temperature | Heating time | Material surface temperature after heating |
|---|---|---|---|---|
| Comparative example 2 | 1 mm | 600° C. | 5 minutes | 600° C. |
| Example 3 | 1 mm | 601° C. | 5 minutes | 204° C. |
| Example 4 | 2 mm | 600° C. | 5 minutes | 176° C. |

Comparative Example 3

The component of the organic resin binder was 100% PPC (25511-85-7, Sigma-Aldrich). Thermogravimetric analysis was used to measure the thermal degradation temperature of the above organic resin binder. The results are listed in Table 3.

Example 5

The component of the organic resin binder was 90% PPC (25511-85-7, Sigma-Aldrich) and 10% potassium hydroxide (1310-58-3, Sigma-Aldrich). Thermogravimetric analysis was used to measure the thermal degradation temperature of the above organic resin binder. The results are listed in Table 3.

Example 6

The component of the organic resin binder was 90% PPC (25511-85-7, Sigma-Aldrich) and 10% benzyl glycidate (Sigma-Aldrich). Thermogravimetric analysis was used to measure the thermal degradation temperature of the above organic resin binder. The results are listed in Table 3.

TABLE 3

| | Component | Thermal degradation temperature |
|---|---|---|
| Comparative Example 3 | 100% PPC | 208° C. |
| Example 5 | 90% PPC + 10% KOH | 178° C. |
| Example 6 | 90% PPC + 10% $C_{11}H_{13}O_3$ | 158° C. |

Comparative Example 4

Figure 3:
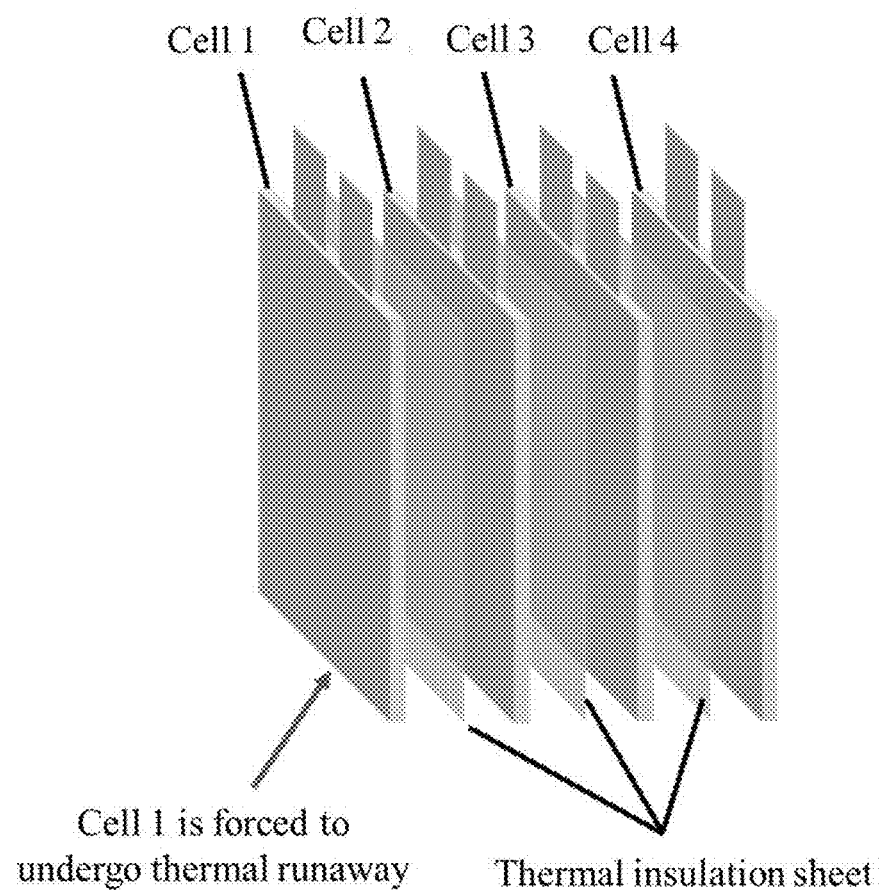
FIG. 3 is a schematic diagram of the thermal runaway experiment in the Examples of the present disclosure.

Mica with a thickness of 1 mm was used as a thermal insulation sheet. As shown in FIG. 3, a battery module with 4 pouch cells (250 Wh/kg, 550 Wh/L) was used as the test carrier. Cell 1, cell 2, cell 3 and cell 4 were arranged in parallel as shown in FIG. 3. The mica sheet was inserted as a thermal insulation sheet between two cells. A total of 3 mica sheets were used in this module.

During the test, Cell 1 was forced to undergo thermal runaway. The time for thermal runaway of cell 2, cell 3 and cell 4 was recorded. The 4 pouch cells were placed in a large enough open space so that the hot gas generated by the thermal runaway of the cells will not affect adjacent cells. Thermal runaway can only be caused by heat transfer between adjacent cells. The experimental results are listed in Table 4.

Example 7

The composite thermal insulation material of Example 1 with a thickness of 1 mm was used as a thermal insulation sheet.

Figure 2:
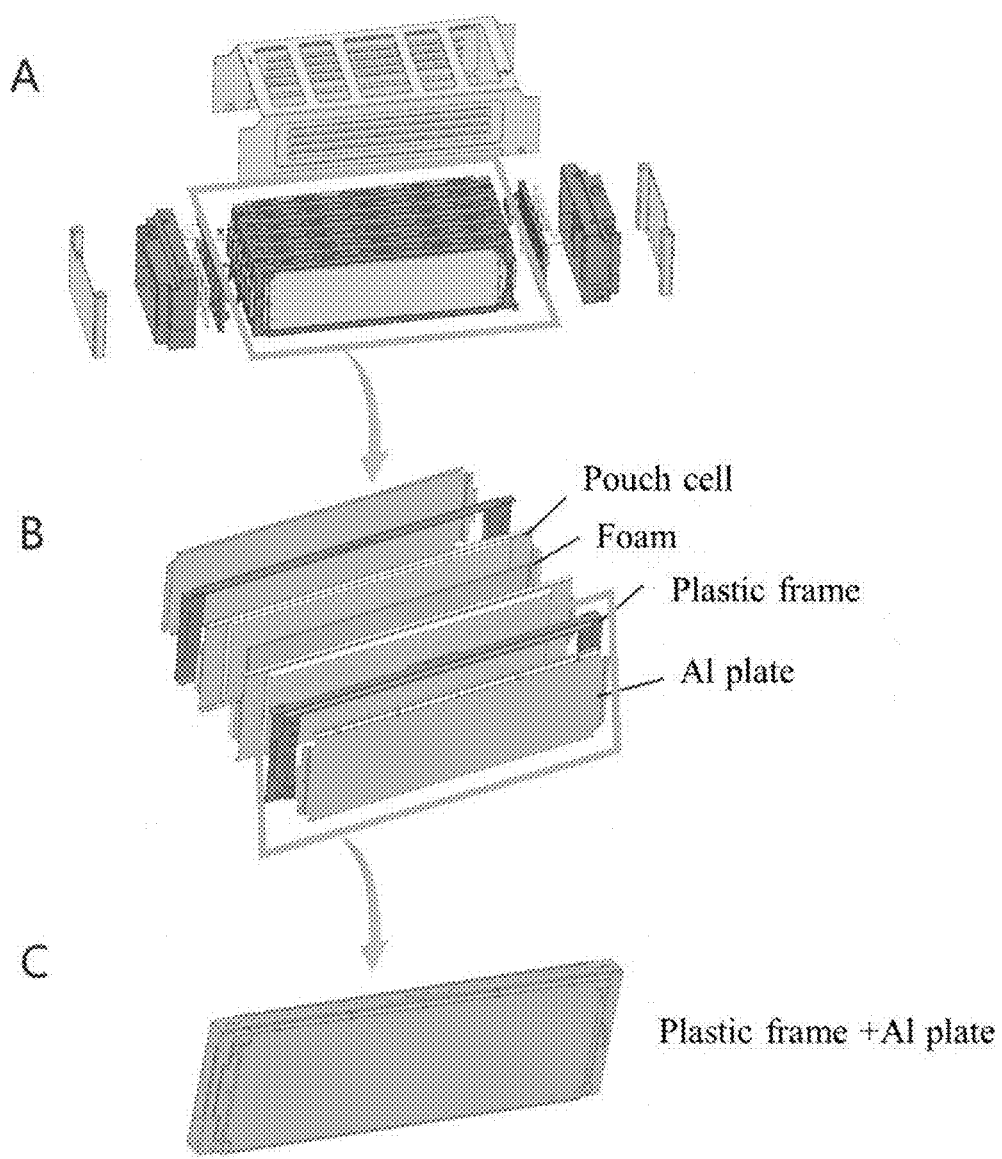
FIG. 2 is an exploded view of the pouch cell module in the Examples of the present disclosure.

As shown in FIG. 2, picture A in FIG. 2 is an exploded view of the pouch cell module; picture B in FIG. 2 is the core structure of the module including aluminum plate→plastic frame→pouch cell→foam→pouch cell→plastic frame→aluminum plate in order; picture C in FIG. 2 is the aluminum plate and frame in picture B, which were prepared with the composite thermal insulation material.

As shown in FIG. 3, a battery module with 4 pouch cells (250 Wh/kg, 550 Wh/L) was used as the test carrier. Cell 1, cell 2, cell 3 and cell 4 were arranged in parallel as shown in FIG. 3. The composite thermal insulation sheet was inserted as a thermal insulation sheet between two cells. A total of 3 composite thermal insulation sheets were used in this module.

During the test, cell 1 was forced to undergo thermal runaway. The time for thermal runaway of cell 2, cell 3 and cell 4 was recorded. The 4 pouch cells were placed in a large enough open space so that the hot gas generated by the thermal runaway of the cells will not affect adjacent cells. Thermal runaway can only be caused by heat transfer between adjacent cells. The experimental results are listed in Table 4.

Example 8

The composite thermal insulation material of Example 2 with a thickness of 2 mm was used as a thermal insulation sheet.

As shown in FIG. 3, a battery module with 4 pouch cells (250 Wh/kg, 550 Wh/L) was used as the test carrier. Cell 1, cell 2, cell 3 and cell 4 were arranged in parallel as shown in FIG. 3. The composite thermal insulation sheet was inserted as a thermal insulation sheet between two cells. A total of 3 composite thermal insulation sheets were used in this module.

During the test, cell 1 was forced to undergo thermal runaway. The time for thermal runaway of cell 2, cell 3 and cell 4 was recorded. The 4 pouch cells were placed in a large enough open space so that the hot gas generated by the thermal runaway of the cells will not affect adjacent cells. Thermal runaway can only be caused by heat transfer between adjacent cells. The experimental results are listed in Table 4.

TABLE 4

| | Thermal insulation sheet thickness | Time when thermal runaway occurs | | |
|---|---|---|---|---|
| | | Cell 2 | Cell 3 | Cell 4 |
| Comparative Example 4 | 1 mm | 2 m 3 s | 5 m 25 s | 7 m 39 s |
| Example 7 | 1 mm | 14 m 23 s | 35 m 36 s | No runaway |
| Example 8 | 2 mm | 27 m 49 s | No runaway | No runaway |

The above examples illustrates that the module component formed from the thermal insulation composition of the present disclosure, when used in lithium-ion batteries, not only has both mechanical strength and functionality, but also can play the role of fire prevention and thermal insulation when thermal runaway occurs, blocking heat propagation and greatly improving the safety performance of the batteries.

The invention claimed is:

1. A thermal insulation composition, wherein the thermal insulation composition comprises a composite of an aerogel material and an organic resin, and a composite mass ratio of the aerogel material to the organic resin is 5 wt %: 95 wt % to 50 wt %: 50 wt %;

a porosity of the aerogel material is greater than 95%, a pore size of the aerogel material is less than or equal to 100 nm, and a particle size of each particle of the aerogel material is 5 nm to 20 nm; and the organic resin is filled in pores of the aerogel material.

2. The thermal insulation composition according to claim 1, wherein the aerogel material is prepared by the steps of:

preparing a precursor solution for forming the aerogel material;

solating the precursor solution by a polycondensation reaction;

aging the solated precursor solution at 45° C. to 60° C. for 8 to 24 hours; and performing supercritical drying to obtain the aerogel material.

3. The thermal insulation composition according to claim 2, wherein the supercritical drying is performed at a temperature of 30° C. to 60° C.

4. The thermal insulation composition according to claim 3, wherein a medium for the supercritical drying is carbon dioxide, methanol or ethanol.

5. The thermal insulation composition according to claim 3, wherein a duration of the supercritical drying is 2 to 5 hours.

6. The thermal insulation composition according to claim 3, wherein the supercritical drying is performed under a pressure of higher than 1.01 MPa.

7. The thermal insulation composition according to claim 2, wherein a solvent used in the precursor solution for forming the aerogel material is water, a mixture of water and ethanol, propylene carbonate, ethylene carbonate, diethyl carbonate, dimethyl carbonate or 1-ethyl-3-methylimidazolium bis(trifluoromethanesulfonyl)imide.

8. The thermal insulation composition according to claim 1, wherein a raw material of the aerogel material comprises a precursor; the precursor is one or two or more of silica, titanium oxide, chromium oxide, iron oxide, vanadium oxide, neodymium oxide, carbon and oxides of carbon with a particle size of less than 500 nm.

9. The thermal insulation composition according to claim 8, wherein the precursor comprises one or two or more of silica, titanium oxide and carbon with a particle size of less than 500 nm.

10. The thermal insulation composition according to claim 9, wherein the precursor comprises silica with a particle size of less than 500 nm.

11. The thermal insulation composition according to claim 8, wherein the raw material of the aerogel material further comprises an additive, and the precursor is added in an amount of 60-90% by weight in the aerogel material when the additive is comprised.

12. The thermal insulation composition according to claim 11, wherein the additive is one or two or more of a glass fiber and an opacifier.

13. The thermal insulation composition according to claim 1, wherein the organic resin comprises any one or two or more of polymethyl carbonate, polyethyl carbonate, polypropylene carbonate, polymethyl carbonate modified with a functional group, polyethyl carbonate modified with a functional group, and polypropylene carbonate modified with a functional group.

14. The thermal insulation composition according to claim 13, wherein the functional group comprises hydroxyl, carboxyl, halogen or propylene oxide.

15. A thermal insulation module component, wherein the thermal insulation module component comprises the thermal insulation composition of claim 1.

* * * * *